Dec. 24, 1957  P. H. WOODS ET AL  2,817,160
UNIVERSAL RADIO AIDS AND OMNI NAVIGATION RECORDER BOARD
Filed Oct. 6, 1954  3 Sheets-Sheet 1

INVENTORS.
PAUL H. WOODS
MERRITT HICKMAN
BY
ATTORNEYS

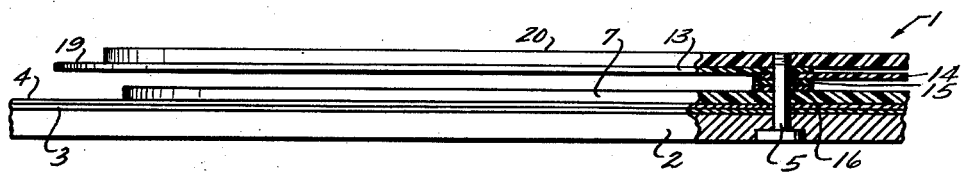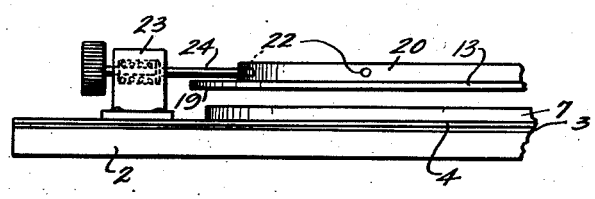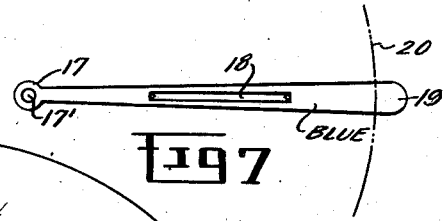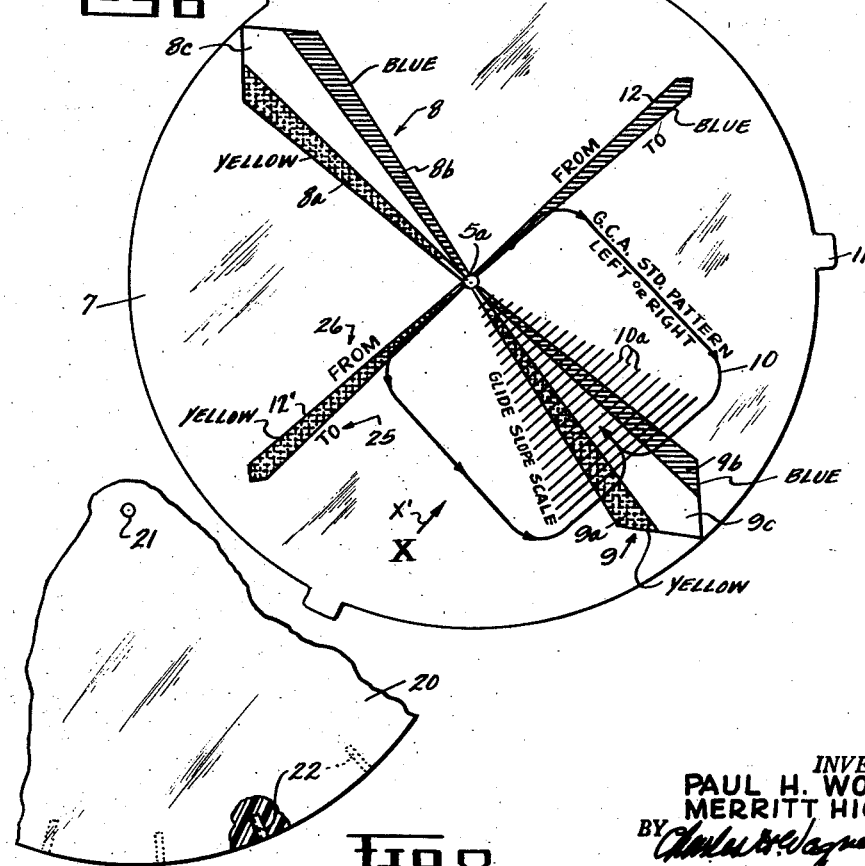

United States Patent Office 2,817,160
Patented Dec. 24, 1957

2,817,160

UNIVERSAL RADIO AIDS AND OMNI NAVIGATION RECORDER BOARD

Paul H. Woods, Independence, Iowa, and Merritt Hickman, Eatonville, Wash.

Application October 6, 1954, Serial No. 460,782

19 Claims. (Cl. 35—10.2)

(Granted under Title 35, U. S. Code (1952), sec. 266)

The invention described herein may be manufactured and used by or for the United States Government for governmental purposes without payment to us of any royalty thereon.

This invention relates to synthetic aircraft flight trainer equipment, and more particularly to a radio instrument flight training, instruction, and OMNI range aids device, having for one of its objects a universal radio instrument aircraft navigational training aid device adapted for use in connection with conventional instrument flying and landing ground trainers of the Link type, for instance such as those known as the AN–T–18 and C–8 models, and is adaptable as a training aid for the display of any type of simulated radio aids, patterns, and systems, including Low Frequency Ranges, Automatic Radio Compass (ADF), Instrument Landing System, Ground Controlled Approaches (GCA), Visual-Aural Ranges, and the latest OMNI range navigation, on which any selected station and range can be simulated or set up almost instantly and used without the requirement of any maps and charts, in combination with a standard conventional Link trainer automatic flight recorder to record the simulated aircraft flight path, particularly "on instrument."

Another object is the inclusion therein of indicia and data adaptable for simulating any standard approach, let-down procedure, and orientation patterns for substantially any field and radio station throughout the country, many of which have their own individual let-down and orientation pattens, it being previously necessary for the operator (instructor) to utilize a different chart for each approach and orientation problem that the pilot or trainee selected or requested for a desired cross-country flight training procedure, these charts often being not available, and quite often obsolete.

A further object is the provision of a radio navigation aids device for ground trainers which is extremely flexible in its adaptation, so that an infinite number of simulated actual flight training procedures can be quickly and progressively "set up" as desired by the trainer pilot during a synthetic cross-country flight, without the necessity of interrupting the flight or making a change in equipment, such as the replacement of charts or other flight patterns.

A further object is the provision of an instrument flight training aids device which can be employed as a visual demonstrator device for presenting OMNI range work in which the bearing selected and the position of the recorder on the supporting board or flight table can be visually pictured by the trainee or pilot, and the action of the flight path deviation indicator or localizer needles, and the "To-From" indications can be readily associated with something tangible to help visualize the relative flight position around any OMNI range station in relation to the bearing or range that may be selected.

A further object is the provision of a universal radio aids OMNI navigation board which is simple and economical to manufacture and simple to adjust and operate, requiring no electronics of any kind, nor skilled technicians for its maintenance.

Other objects and advantages of the invention will become apparent from the following description, taken in conjunction with the accompanying drawings in which like referenced characters refer to like parts in the several figures.

Drawings

Figure 3 is a further enlarged vertical cross-sectional view through the board shown in Fig. 2 (parts being broken away and foreshortened).

Figure 4 is a further enlarged fragmentary vertical sectional view illustrating the indexing or locking means for the top disc on which the flight recorder is adapted to travel in simulating an aircraft flight.

Figure 6 is a plan of the circular transparent range disk having a standard VOR visual-aural and ILS beam pattern delineated thereon in colors together with an appropriate universal glide path slope and a standard GCA pattern, both left and right handed, for use in simulating any let-down procedures at any station elevation.

Figure 7 illustrates one of the multiple adjustable range legs, adapted for superimposed pivoted mounting above the disk Figure 6 at the center thereof.

Figure 8 is a fragmentary view illustrating the top or transparent recorder supporting disk, preferably slightly larger in diameter than the range disk shown in Figure 6 on which the conventional Link type recorder is adapted to travel in recording a simulated OMNI range flight thereon.

Figure 1:
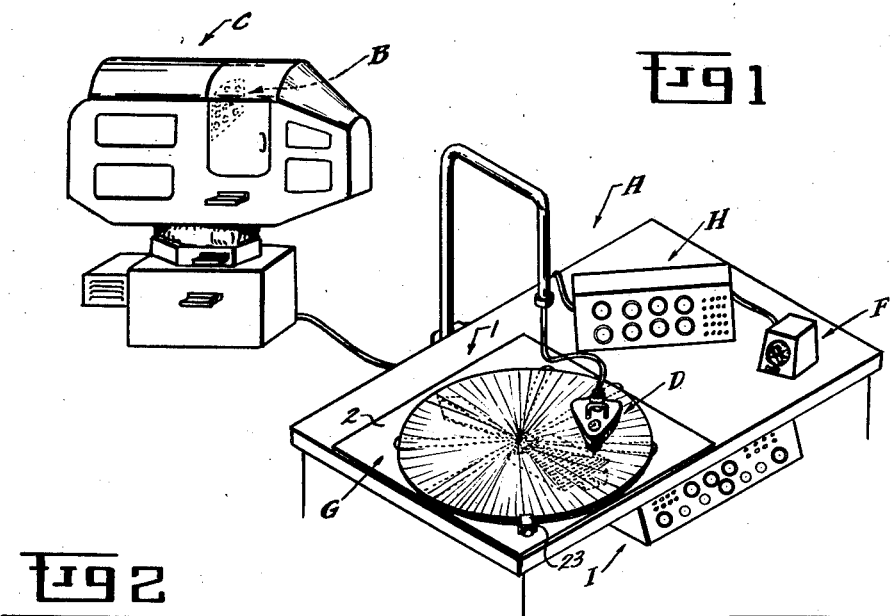
Figure 1 is a schematic perspective view of aircraft flight trainer of the Link type, illustrating the invention incorporated therein.

Referring to Figure 1, depicting very schematically a conventional instrument flying ground trainer of the Link type having the novel portable OMNI navigational board improvement in position therein, the reference letter A denotes the instructor's station, and B is the pilot's or trainee's station in the simulated flight trainer aircraft C, the dirigible flight recorder being depicted at D resting on the OMNI navigation Aids Board 1, the OMNI range selector and indicator, constituting another separate invention being shown at F. The range table or platform, or instructor's "desk" is indicated at G, preferably having sufficient length and width to accommodate a somewhat extensive cross-country simulated flight, preferably having an extensive cross-country range map or series of maps on a small scale (not shown) secured thereon preferably depicting all radio stations and ranges thereon in correct orientation necessary for the cross-country flight.

Convenient to the instructor's control station A are the conventional instructor's remote instrument control panel H, and the instructor's radio instrument control panel I, being conventional Link trainer indicated elements they form no part of the invention except in the combination as claimed, being primarily set forth for convenience in describing their association in the combination and operation of the invention in conjunction with a Link trainer type of apparatus incorporating the invention.

The universal radio aids and OMNI navigation recorder board as indicated at 1 comprise a substantial rigid rectangular base panel or support 2 on the upper surface of which is mounted or delineated a chart or map having a standard polar coordinate graph and compass rose pattern depicted thereon and may also have any desired "local" area and range segments delineated thereon, as indicated at 3, a thin transparent plastic protective cover or surface 4 extending coextensively over the upper chart surface. A pivot pin 5 fixed in the base panel 2 projects upwardly from the center of the compass rose 6 perpendicular to said upper surface. A convenient size for the board or panel 1 is approximately 48" by 36" by 3/16" thick so that the same is portable and can be shifted around on the top of the flight table G, and correspondingly adjusted if desired as the simulated flight progresses.

A circular comparatively thin range disk 7 of transparent material such as Plexiglas having a central pivot aperture 5a therethrough is pivotally journaled on the pivot pin 5 for rotative adjustment on base 2. For the size of the base panel 2 indicated above the range disk 7 should be about 36" in diameter.

The range disk 7 as shown in Figure 6 has delineated thereon a standard VAR or VOR and ILS beam pattern on one of its faces the range sectors being as indicated at 8 and 9 (shading in this figure denoting color), comprising the two segments 8a and 9a colored yellow and blue as indicated at 8a, 9a, and 8b, 9b, respectively with clear or transparent sectors 8c and 9c therebetween, and a standard GCA pattern 10 both left and right handed with equally spaced distance indicating bars or lines 10a on which "let down" elevation notation figures can be inserted, the bars 10a matching the concentric circular polar coordinate divisions 6a on the base chart 2, representing distances from the edge of the landing strip. The range disk 7 is also provided with finger lugs 11, and two "From-To" rather narrow yellow and blue transverse pointers 12 and 12' radiating outwardly from the center of the pivot opening 5a in opposite directions, each half way between the two pointers 8 and 9, the one projecting from the yellow segments 8a or 9a of the OMNI range pointers 8 and 8 being colored yellow to correspond with the color of the yellow segments in the beams 8 and 9. The pointer projecting from the blue segments 8b and 9b is blue.

The yellow-blue segments 8 and 9 on the range disk 7 represent a standard OMNI VAR and ILS beam sensitivity pattern. These OMNI sectors when considered for use on the I. L. S. localizer needle, are 20 degrees wide from the outside edge of the blue to the outside edge of the yellow area, and the necessary deflections are transmitted to the Link trainer ILS indicator from the instructor's station to the trainee's instrument panel in the trainer and to the instructor's similar instrument with correct sensitivity when using the simulated VAR or VOR range pattern, which both have approximately a 20 degree sensitivity spread. For I. L. S. the sensitivity pattern is measured from the opposite side edges of the clear segments 8c or 9c between the yellow-blue segments being five degrees in width. In a simulated flight with the I. L. S. localizer, the sensitivity is increased on the indicator proportionately. In simulating a "let down" problem, a grease pencil may be used to write in correct simulated glide path elevations on the bars 10a to indicate at 100 ft. intervals from the landing field (at the center of the range disk and aperture 5a) the simulated elevations in the glide path for the station which the trainee selects for the approach.

Figure 2:
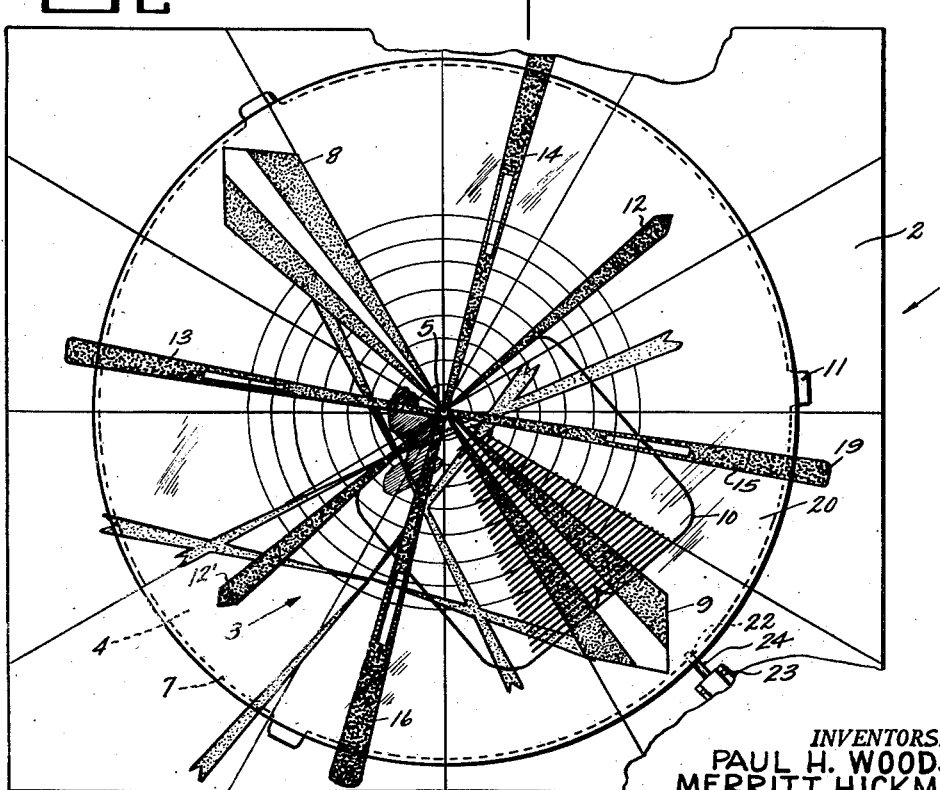
Figure 2 is a plan view of the universal radio aids OMNI navigation board shown in Figure 1, but on an enlarged scale.
Figure 5:
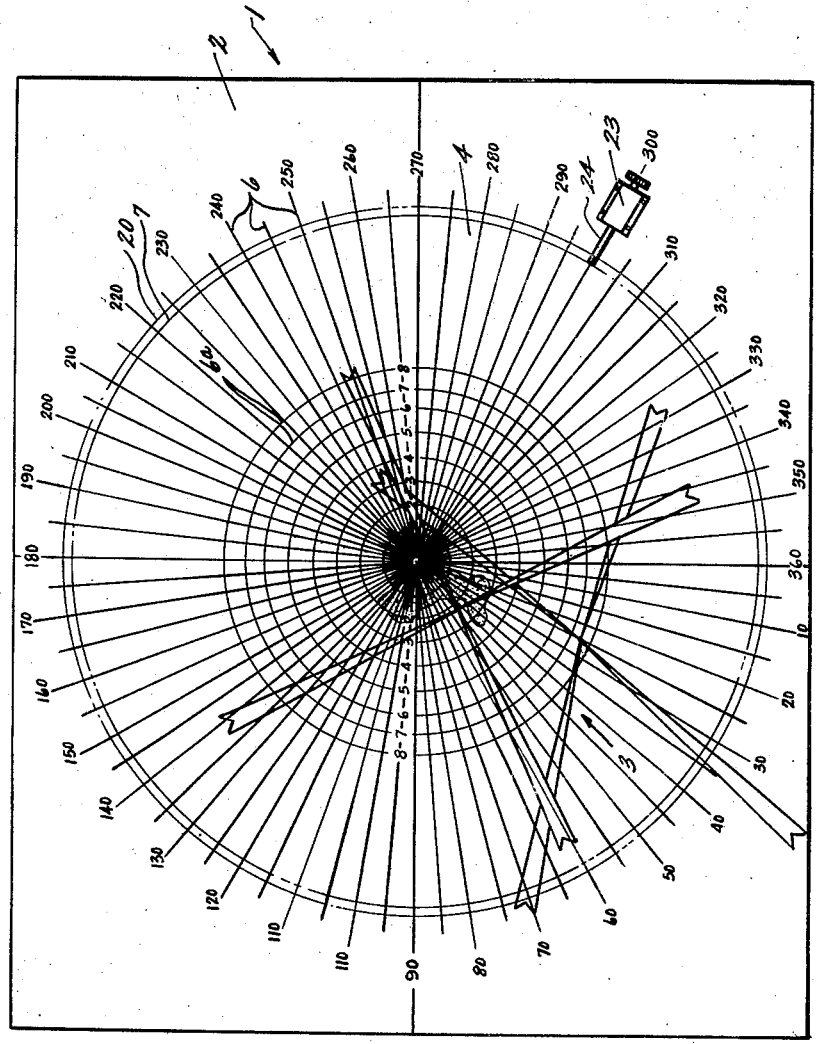
Figure 5 is a detail plan view of the rectangular base board of the device having the standard radio compass rose thereon.

On the top surface of the large disk 7 are mounted four portable range legs, indicated at 13, 14, 15 and 16 in Figure 2. These being made of thin durable plastic sheet material, each of which being identical, only one is shown in detail on an enlarged scale (in Figure 7), each comprising an enlarged hub portion 17 which is apertured at 17' to receive the pivot pin 5 of the base panel 2 therethrough, providing pivots for the range legs when superimposed above the range disk 7. These range legs are preferably colored blue, being about 5 degrees wide, with a three degree low/frequency beam width drawn thereon, having a narrow clear longitudinal central opening or slit 18 in them for accurate alignment with the compass rose pattern 6, to determine their position relative to the station selected. When the VAR range pattern is desired these low frequency legs 13—16 are paired together to form the aural course of the range at right angles to the visual course. The range legs preferably extend outwardly beyond the periphery of the range and cover disks terminating in actuating extremities or handles 19 by which the instructor can adjust the angular relations therebetween on the range disk 7 with reference to the compass rose below for setting up any desired range pattern. These range legs are removable from the pivot pin 5 when desired by lifting off the top disk 20 and removing them.

The top, or circular recorder supporting and tracking disk indicated at 20 is shown in Fig. 8, being preferably made from clear plastic material such as Plexiglas with a diameter which is slightly greater than the diameter of the range disk 7, a central journal socket or aperture 21 being provided in the under side for receiving the pivot pin 5 to position the recorder supporting disk 20 in concentric superimposed co-extensive relation above the disk 7 with the range legs 13—16 sandwiched therebetween.

The disk 20 is formed with one (or more) locking apertures or notches 22 at its periphery for "indexing" the disk 20 on the base 2 in the same position each time, and preventing accidental rotation of the disk 20 by the recorder, or when the lower range disk 7, and/or the range legs are adjusted on the pivot pin 5 for setting up different simulated range problems, and during tracking movement of the recorder thereon. It is preferable that the end of the pivot pin 5 be flush with or below the top surface of the recorder disk 20 with means for supporting the center of the disk against its weight of the recorder so as to be out of the possible path of the ink "tracking" wheel of the recorder device D.

The indexing or locking device comprises a support or standard 23 which is fixed on the base panel 2 in sufficiently radially spaced relation from the periphery of the disks 7 and 20 to allow the manipulating tabs or handles 11 (of disk 7) and the handle extremities 19 of the range legs 13—16 to pass, the standard 23 carrying an inwardly projecting radial pin 24 adapted to enter the aperture 22 fixing the disk 20 against rotation on the pivot pin 5 relative to the base panel 2.

*Operation*

Reference being made to Figure 1, assuming that a trainee in the simulated aircraft trainer device B has requested a cross-country flight on instruments involving an OMNI range problem, or series of progressive OMNI range problems as in a long cross-country simulated flight, the instructor may place the base board or panel 2 at some appropriate or convenient place on the cross-country flight table G where the simulated flight is to begin such as shown above in Fig. 1. The first range station simulated at the center of the disk (pivot pin 5) is "set up." This is done by orienting the lower or range disk 7, by manipulation of the tabs 11 to dispose the direction of the OMNI range sectors 8 and 9 in the proper oriented direction with respect to the "compass rose" indicia on the base board 2, as seen through the clear portions 8c and 9c, or with reference to the pointed arrow ends of the range beam sectors. The top or superimposed recorder supporting disk 20 is of course locked in position by the indexing pin 24 interengaging the socket 22 in the disk 20.

The exact simulated position and direction of the simulated aircraft on the supporting disk 20 is now determined with respect to the simulated OMNI radio station at the center of the disk, forming the beginning of the first leg of the simulated flight. The instructor places the recorder D, commonly known as the "bug," with its ink tracking wheel on the top surface of the upper disk 20, its position being determined by the compass rose 6 and radial distance polar coordinate circles 6a of the standard compass rose chart polar graph pattern on the base panel 1, the tracking direction being determined by the orientation of the Link type trainer C.

Assuming that the flight recorder D is at the position marked X in Fig. 6, the instructor, by reference to the radio compass bearing and OMNI range direction should manipulate the switch to display the "TO" signal for the OMNI range, providing that the OMNI range selector indicators on the pilot's and instrument panels B and H are in the same hemisphere as indicated by the radio compass pointers (position plus 90° at both sides thereof) located at the pilot station B and on instructor's radio instrument control panel I. The instructor by watching the progress of the recorder as the simulated flight proceeds, for instance in the direction of the arrow X' (Fig. 6) when the recorder enters the yellow sector 9a can manipulate the localizer control knob (which is conventional on Link type trainer instructor's radio instrument control panels) to adjust the off center position of the localizer bar in the flight trainer accordingly. As the center of the clear segment 9c within the sector 9 is reached the localizer bar should be preferably "centered," also the radio compass indicators will be progressively adjusted to indicate the relativity changing positions of the radio station, also the conventional OMNI station identification signals are controlled by the instructor. Should the pilot plan to "ride" the OMNI range beam he should change his simulated course as determined by his radio compass, and the localizer indicators either for a "let down," or a flight over the station, the advancing recorder upon passing beyond the center pin 5a with the instructor observing the position of the tracking wheel of the recorder, reverses the position of the radio compass needle, the tracking wheel now being in the hemisphere including the "From" indicia as indicated at 26, the instructor can immediately close his control switch to display the "From" OMNI signal on the trainee's instrument panel. The indicia "To" is indicated at 25, when the opposite procedure is used.

The next or preceding OMNI range station and range sectors can be quickly set up by the instructor by manipulation of the tabs 11 to adjust the direction of the OMNI range beams 3 in the properly oriented direction to that of the preceding simulated station, also the instructor can re-position the recorder relative to the newly set up station on the recorder supporting disk 20 to the position that the simulated aircraft now bears to the position of the new station, this process being repeated as often as necessary to simulate any long cross-country flight. Other or intermediate range stations can be easily set up as or when desired by adjusting the positions of the range legs relative to the compass rose 6, from standard map data or other information at the instructor's command.

Assuming the problem includes a "let down" or landing, the G. C. A. right or left pattern 10 can be used to simulate the instrument landing. The instructor can write in the proper let-down altitudes plus station elevation indicia for the desired glide path on the glide slope scale for any selected station, at any elevation for GCA or ILS. In simulating the approach the trainee controls his simulated altitude and let-down from his simulated altimeter and the simulated "Cross Pointer" of the standard beam approach localizer indicator, this being conventional in Link trainers, and also under control of the instructor who manipulates the cross pointer control with reference to the simulated altimeters or gives voice instructions to maintain the GCA glide pattern (at instructor's and trainee's station). When the proper altitudes for the steps in the glide path, as previously filled in on the bars or lines for the simulated distances from field correspond to the altitude readings during the approach and glide the cross pointer is adjusted by the instructor to indicate that the trainee is on the proper glide path for that particular station.

While there has been shown and described a specific embodiment of the invention for exemplary purposes, rather than in a limiting sense, it therefore being understood that various changes may be made therein without departing from the spirit or scope of the invention as defined in the following claims.

We claim:

1. A universal radio aids OMNI navigation board for use with instrument flying ground trainers of the Link type, comprising a base supporting panel having a compass rose and polar coordinate pattern thereon, a transparent range plate rotatably superimposed above the base panel for rotation about the center of said compass rose pattern, having an OMNI range Visual-Aural and ILS beam pattern depicted thereon radiating outwardly from the center of the compass rose pattern, and rotatably adjustable relative to the compass rose pattern for registration with any selected degree to select the direction of any desired OMNI range, Visual-Aural and ILS beam pattern heading a transparent recorder supporting plate spaced above said range plate for supporting the recorder device of the Link type trainer for travel thereon, said recorder supporting plate being rotatable and supported in spaced relation above said base panel to permit rotative adjustment of the range plate, and releasable latch means between the base panel and said recorder supporting plate for fixing the recorder supporting plate against rotation relative to the base panel.

2. A universal radio aids OMNI navigation board for use with conventional Link trainers comprising a portable base supporting panel having an upper surface, a standard compass rose polar coordinate pattern depicted on said upper surface, a pivot pin projecting upwardly from the upper surface at the center of the compass rose polar coordinate pattern, perpendicular to said upper surface, a transparent circular range disk having a central journal aperture therethrough receiving said pivot pin, for mounting said range disk for rotative adjustment on said base panel upper surface, said range disk having OMNI range VAR and ILS sector patterns depicted thereon diverging outwardly in opposite direction from the center of said journal aperture, whereby the range plate is rotatably adjustable for alignment of the OMNI range pattern with any compass rose bearing on said compass bearing polar coordinate pattern, a transparent supporting plate supported in spaced parallel relation above said upper surface of said range disk, permitting rotative adjustment of said range plate above said upper surface including supporting means between said transparent supporting plate and said base panel, in combination with a dirigible flight recorder of a Link type trainer disposed on said supporting plate in any selected position relative to said compass rose polar coordinate pattern for simulated flight travel relative to said OMNI range VAR and ILS sectors on said rotatable range disk in simulating any OMNI range VAR and ILS flight problem on a Link type trainer and releasable latch means between the transparent supporting plate and said base supporting panel.

3. Apparatus as claimed in claim 2 in which the supporting plate comprises a substantially transparent flat circular disk at least coextensive with said range disk, having a central recess opening in the under side thereof but not extending completely therethrough for receiving the pivot pin therein to support the center of the supporting plate in spaced relation above said range disk, indexing means between the base panel and the periphery of said supporting plate for preventing accidental rotative movement of said supporting plate relative to said base panel during rotative adjustment of said range disk for changing the OMNI range direction relative to said compass rose and during travel of the recorder of a Link type trainer thereon in carrying out a simulated radio instrument flight problem on a Link type trainer.

4. Apparatus as claimed in claim 1 in which said OMNI range sectors on said range disk are pointed at their outer ends with said pointed extremities located on the longitudinal center line of said OMNI range sectors substantially at the periphery of said range disk.

5. Apparatus as claimed in claim 4 in which the OMNI range sectors at one side of said longitudinal center line are colored yellow, and at the other side of said longitudinal center line are colored blue, for denoting the conventional yellow-blue segments of the ILS and VAR radio range.

6. Apparatus as claimed in claim 5 in which the yellow-blue range sectors are 20° wide between their opposite side edges and include a transparent non-colored mid segment between said pointed extremities and the pivotal center of the range disk which is substantially 5° wide for simulating the I. L. S. range beam width.

7. Apparatus as claimed in claim 6, having two tapered transverse sectors delineated on the surface of the range disk, radiating outwardly in opposite direction from the pivotal center of the disk perpendicular to the said longitudinal center line, and having pointed ends terminating short of the said range disk periphery, the transverse sector projecting outwardly away from the yellow colored segments being colored yellow and the transverse sector radiating outwardly midway between and from the blue sectors being colored blue.

8. Apparatus as claimed in claim 7 including a standard right and left G. C. A. pattern superimposed on one of said OMNI range sectors with its side legs in equally spaced parallel relation at opposite side of the longitudinal center line of the OMNI sector, and its inner transverse legs centered on said transverse yellow and blue sectors and its outer parallel legs disposed adjacent the pointed end of said OMNI range sector, said range disk having OMNI range direction indicia delineated thereon adjacent the opposite side edges of said yellow and blue transverse sectors, said indicia adjacent the edges of said transverse sectors facing toward said G. C. A. pattern on the OMNI range sector being marked "TO," and said indicia at the opposite side of said transverse yellow and blue sectors being marked "FROM," whereby the position of the recorder on the surface of said supporting disk in the hemisphere at either side of said transverse blue sectors with relation to the center of said range disk simulating the radio range station, indicates directly to the instructor the simulated flight direction and position, as determined by the recorder position on the supporting disk.

9. Apparatus as set forth in claim 8 including a glide path scale delineated on said range disk within said GCA pattern, comprising a series of equally spaced lines perpendicular to said longitudinal center line of the OMNI range and ILS beam sector and adapted for cooperative registration with said polar coordinate indicia on said base panel upper surface, whereby any selected "let down" elevation data may be written thereon simulating any selected glide toward any landing field represented by the center of the range disk can be observed by the instructor in operation of a Link type trainer in simulating an instrument controlled approach and landing by a trainee in the trainer.

10. In combination with a conventional type Link trainer having a trainee's simulated aircraft control station, an instructor's control station, instrument control means thereon connected to the trainee's control station for indicating flight conditions at the trainee's station during a simulated flight by a trainee involving a radio range problem, a dirigible flight recorder connected to the trainee's control station for controlled operation thereof by the trainee, a flight platform having indicia thereon simulating the area to be flown over located at said instructor's station for supporting said recorder during its progressive movement thereon simulating an aircraft flight, a transparent base panel carried on the upper surface of said platform having a conventional concentric compass rose and polar coordinate pattern on the upper surface thereof, a circular transparent OMNI range disk mounted pivotally on said transparent base panel for concentric rotative adjustment above said compass rose polar coordinate pattern, an OMNI range sector pattern delineated on said range disk radiating outwardly in diametrically opposite directions from the center of the range disk, said range sector patterns having a common center line and side edges diverging at substantially 20 degrees, simulating the width of a standard OMNI range and VAR (Visual-Aural Range) sector, both sectors being colored one distinctive color at the same side of said center line, and colored another distinctive color at the opposite side of said center line, simulating the yellow and blue segments of an OMNI range, a GCA standard approach pattern delineated on one of said OMNI range and ILS beam segments having a base leg perpendicular to said OMNI range sector center line and passing through the pivot center of the range disk, an approach leg on said center line and a return leg spaced at each side of the associated OMNI range sector, parallel to said center line and an outer leg crossing said associated OMNI range segment perpendicular thereto, adjacent its outer end, a glide path determining scale delineated on said range disk comprising equally spaced parallel lines between said base leg and said outer leg extending perpendicular to said OMNI range sector center line, progressively decreasing in length from said outer leg to said base legs, and disposed for cooperative registration with said polar coordinate pattern on said base panel upper surface, transverse direction indicating pointers delineated on said range disk on a line through its pivotal center, perpendicular to said OMNI range sector center line, said pointers radiating outwardly in opposite directions from range disk pivotal center to points adjacent the periphery of said range disk, cooperative hemispherical direction indicating indicia adjacent the sides of both transverse pointers nearest to said GCA standard patterns on the range disk and marked "TO," to indicate a simulated approach hemisphere surrounding the last mentioned OMNI range sector, and said transverse pointers being marked "FROM," at the opposite sides to indicate a simulated departure hemisphere surrounding the opposite sector of the OMNI range, a transparent recorder supporting disk supported above said range plate in spaced relation to said range plate and at least coextensive thereto, for supporting the recorder of a Link type trainer thereon above said range plate, including supporting means for said recorder disc in spaced relation to said range plate and preventing accidental rotative displacement of said recorder disc during movement of the recorder thereon.

11. The combination as expressed in claim 10 in which a central segment of each of said OMNI range sectors is left clear between the center of the range disk and the outer end of each OMNI range sector, and having a width of substantially 5 degrees, for simulating an I. L. S. sector and having a longitudinal center line coincident with the OMNI range sector center line.

12. The combination as expressed in claim 11 including a plurality of adjustable range simulating legs colored a distinctive color, pivoted for rotative adjustment about the center of the compass rose polar coordinate pattern on the base panel, and disposed between the upper surface of said base panel and the lower surface of the recorder supporting disk, said range legs each comprising a hub portion at its inner end and a handle portion at its outer end projecting outwardly beyond the periphery of the range disk, for manual adjustment thereof by the instructor in setting up any selected oriented simulated range legs below said recorder relative to the position thereof, radiating outwardly from the center of the compass rose polar coordinate pattern in any selected directions.

13. The combination as expressed in claim 12, in which said range legs have an angular relation between their opposite side edges substantially similar to the angular relation between the side edges of the transparent segments of the OMNI range sectors.

14. Combination as set forth in claim 13 in which said range legs each are formed with a narrow elongated transparent window located on their center lines midway between the hub and handle portions thereof for observing the compass rose pattern therethrough in setting up any predetermined angular relation between said legs.

15. A radio range simulating recorder support for a Link type instrument flying ground trainer comprising a base panel adapted to rest on a Link type trainer range table for the Link type recorder to travel thereover in simulating any predetermined aircraft radio instrument controlled flight and having an upper surface, a concentric compass rose polar coordinate pattern delineated on said upper surface, a transparent cover sheet coextensive over said pattern for protecting the same, a pivot pin projecting upwardly from the center of said compass rose polar coordinate pattern perpendicular to said upper surface, a transparent circular range disk coextensive over a major portion of said compass rose polar coordinate pattern having a central journal aperture therethrough receiving said pivot pin, for rotatably mounting said range plate above said base panel upper surface, a lug handle projecting outwardly from the periphery of the range disk for manual rotative adjustment thereof, radio range sector simulating pointer means on said range disk, radiating outwardly from its center, whereby said range sector direction is adjustable for registration with said compass rose polar coordinate pattern by rotative adjustment of the range disk, for simulating any selected radio range sector, a plurality of portable range legs for simulating low frequency ranges, said range legs each having a hub portion and a simulated low frequency range sector radiating outwardly from the center of the hub portion, terminating in a handle extremity, said legs being pivoted on said pivot pin in superimposed relation for independent selective angular adjustment relative to each other, said handle extremities projecting outwardly beyond the periphery of the raneg disk for manual adjustment thereof by a Link type trainer instructor, said range legs being each about 5 degrees in width, and a 3 degree low frequency beam pattern drawn on each, colored a distinctive color, and formed with an elongated narrow transparent window slit therein located midway between their opposite side edges for cooperative registration of the compass rose pattern thereunder in setting up any simulated low frequency range pattern, a transparent circular recorder supporting and tracking disk supported immediately above said range disk and said superimposed range legs said supporting plate having a Link type recorder supporting upper surface at least coextensive with the said area of said range disk, excluding a lug handle portion thereon, said recorder supporting disk having a central recess in its lower surface receiving the outer extremity of said pivot pin therein, to support the disk at its center in predetermined spaced relation to the upper surface of the base panel with said range plate and said superimposed range legs therebetween, free for independent angular adjustment relative to said compass rose pattern therebelow.

16. Apparatus as claimed in claim 15 in which said range disk radio range sector simulating pointer delineation comprises an OMNI range pattern centered on a center line radiating diametrically across the range disk from substantially edge to edge through its pivotal axis, OMNI range sectors radiating outwardly from said pivotal axis in opposite directions at substantially 10 degrees each side of said center line forming 20 degree range sectors, a transparent central range segment intermediate the side edges of each of said OMNI range sectors having a divergence angle from said pivotal axis of substantially five degrees, substantially equal to the width of one of the aforesaid range legs, a standard GCA pattern delineated on said range disk over one of said sectors having its base and approach legs centered respectively on said pivotal center and said center line, a standard glide path slope scale in blank, at least partly inclosed within said GCA pattern, having equally spaced transverse glide-altitude determining lines delineated thereon extending perpendicular to said center line, between said pivotal center to a point adjacent the outer end of the associated OMNI range sector, said OMNI range sectors having their outer extremities pointed to register with said center line substantially at the periphery of said range disk, transverse pointers extending from the said pivotal center coincident with said GCA base leg, substantially toward the diametrically opposite sides of the periphery of said range disk, dividing the disk into two hemispheres, said range disk being marked adjacent the side of said transverse pointer facing toward the GCA and glide path pattern with the indicia "TO," and marked with the indicia "FROM" at the side thereof remote from said GCA pattern and glide path slope scale.

17. Apparatus as claimed in claim 16 in which said range legs are colored blue excluding said window opening therein, said left hand segments of said OMNI range sectors, looking toward said pivotal center of the range disk from the outer end of the OMNI range sector associated with said GCA pattern and glide path slope scale being colored yellow to the edge of the transparent central range segment therein and the other side of both of said OMNI range segments beyond the other edge of the central transparent segment therein being colored yellow, simulating the yellow-blue segments of an OMNI range and ILS beam relatively to a Link type recorder simulating an aircraft, when the recorder is in the hemisphere containing the GCA pattern and moving in any combined direction toward the OMNI range sectors and the pivotal center of the range disk.

18. Apparatus as claimed in claim 16 in which said transverse lines of the glide path scale are disposed to cooperate with the polar coordinates to simulate predetermined uniform approach distances from the inner end of the OMNI range sectors at the center of the range disk, represent the landing field adjacent OMNI range station, said transverse lines representing successive let-down altitude from the approach leg of the GCA or ILS (Instrument Landing System) pattern to its base leg, during a simulated radio instrument aircraft landing, said range disk surface adjacent said transverse lines being left clear for the notation thereon by the Link type trainer instructor of the predetermined successively lower let-down altitudes for any GCA or ILS let-down procedure for any simulated landing field at any simulated elevation.

19. Apparatus as claimed in claim 18 in which the aforesaid transverse pointer dividing said range disk in the "TO" and "FROM" hemispheres comprises two narrow sectors radiating outwardly from the midpoint between the OMNI range sectors in opposite directions perpendicular to OMNI range sectors for simulating the aural-null sectors at opposite sides of the yellow and blue segments of the OMNI range beams, the transverse pointer between the yellow segments of the two OMNI range sectors being colored yellow, and the other transverse pointer between the blue segments of the two OMNI range sectors being colored blue.

References Cited in the file of this patent
UNITED STATES PATENTS

| | | |
|---|---|---|
| 2,179,663 | Link | Nov. 14, 1939 |
| 2,370,305 | Guditz | Feb. 27, 1945 |
| 2,373,959 | Horr | Apr. 17, 1945 |
| 2,404,386 | Levine et al. | July 23, 1946 |
| 2,444,477 | Stout et al. | July 6, 1948 |
| 2,485,674 | Suiter | Oct. 25, 1949 |